United States Patent
Connell (10) Patent No.: US 9,796,239 B2
(45) Date of Patent: Oct. 24, 2017

(54) AIR CONDITIONING SYSTEM UTILIZING HEAT RECOVERY VENTILATION FOR FRESH AIR SUPPLY AND CLIMATE CONTROL

(71) Applicant: Bergstrom, Inc., Rockford, IL (US)

(72) Inventor: Brett Sean Connell, Winnebago, IL (US)

(73) Assignee: Bergstrom Inc., Rockford, IL (US)

(*) Notice: Subject to any disclaimer, the term of this patent is extended or adjusted under 35 U.S.C. 154(b) by 267 days.

(21) Appl. No.: 14/209,961

(22) Filed: Mar. 13, 2014

(65) Prior Publication Data

US 2014/0262132 A1    Sep. 18, 2014

Related U.S. Application Data

(60) Provisional application No. 61/778,854, filed on Mar. 13, 2013.

(51) Int. Cl.
*B60H 1/03* (2006.01)
*B60H 1/00* (2006.01)
*F24F 12/00* (2006.01)
*F24F 13/04* (2006.01)

(52) U.S. Cl.
CPC .......... *B60H 1/00457* (2013.01); *B60H 1/03* (2013.01); *F24F 12/006* (2013.01); *F24F 13/04* (2013.01)

(58) Field of Classification Search
CPC .......... F24F 13/04; F24F 12/00; F24F 12/001; F24F 3/147; F28C 3/02; F28C 1/003; B60H 1/00821; B60H 1/00835; B60H 1/00457; B60H 1/03; B60H 1/00007;
(Continued)

(56) References Cited

U.S. PATENT DOCUMENTS

| 2,789,234 A | 6/1956 | Lambert et al. |
| 3,590,910 A | 7/1971 | Lorenz |
| 3,627,030 A | 12/1971 | Lorenz |

(Continued)

FOREIGN PATENT DOCUMENTS

| DE | 4440044 A1 | 5/1996 |
| DE | 100 14 483 A1 | 11/2000 |

(Continued)

OTHER PUBLICATIONS

Bergstrom, Inc., International Preliminary Report on Patentability, PCT/US2014/026683, Sep. 15, 2015, 6 pgs.

(Continued)

*Primary Examiner* — Frantz Jules
*Assistant Examiner* — Nelson Nieves
(74) *Attorney, Agent, or Firm* — Morgan, Lewis & Bockius LLP (57) ABSTRACT

Disclosed is a ventilation module for improving the efficiency of a vehicle HVAC system. The ventilation module includes a return air duct having an outlet to be coupled to the HVAC system. The ventilation module also includes a fresh air duct, a heat exchanger, and first and second doors. The first and second doors connect the return and fresh air ducts upstream and downstream of the heat exchanger. By selectively opening or closing the first and second doors, the ventilation module provides the HVAC system with desired return, fresh or mixed air through the outlet of the return air duct.

15 Claims, 7 Drawing Sheets

(58) Field of Classification Search
CPC ............ B60H 1/00021; B60H 1/00064; B60H 1/00071; B60H 1/00014
USPC .......................................... 165/213; 454/237
See application file for complete search history.

(56) References Cited

U.S. PATENT DOCUMENTS

| | | | |
|---|---|---|---|
| 3,807,087 A | 4/1974 | Staats | |
| 3,844,130 A | 10/1974 | Wahnish | |
| 3,885,398 A | 5/1975 | Dawkins | |
| 3,995,443 A | 12/1976 | Iversen | |
| 4,015,182 A | 3/1977 | Erdman | |
| 4,217,764 A | 8/1980 | Armbruster | |
| 4,271,677 A | 6/1981 | Harr | |
| 4,280,330 A | 7/1981 | Harris et al. | |
| 4,324,286 A | 4/1982 | Brett | |
| 4,359,875 A | 11/1982 | Ohtani | |
| 4,412,425 A * | 11/1983 | Fukami | B60H 1/00007 454/161 |
| 4,448,157 A | 5/1984 | Eckstein et al. | |
| 4,459,519 A | 7/1984 | Erdman | |
| 4,577,679 A | 3/1986 | Hibshman | |
| 4,604,036 A | 8/1986 | Sutou et al. | |
| 4,617,472 A | 10/1986 | Slavik | |
| 4,641,502 A | 2/1987 | Aldrich et al. | |
| 4,658,593 A | 4/1987 | Stenvinkel | |
| 4,667,480 A | 5/1987 | Bessler | |
| 4,694,798 A | 9/1987 | Kato et al. | |
| 4,748,825 A | 6/1988 | King | |
| 4,825,663 A | 5/1989 | Nijar et al. | |
| 4,841,733 A * | 6/1989 | Dussault | F24F 12/001 165/223 |
| 4,856,078 A | 8/1989 | Konopka | |
| 4,893,479 A | 1/1990 | Gillett | |
| 4,945,977 A | 8/1990 | D'Agaro | |
| 4,947,657 A | 8/1990 | Kalmbach | |
| 5,046,327 A | 9/1991 | Walker | |
| 5,067,652 A | 11/1991 | Enander | |
| 5,095,308 A | 3/1992 | Hewitt | |
| 5,125,236 A | 6/1992 | Clancey et al. | |
| 5,170,639 A | 12/1992 | Datta | |
| 5,275,012 A | 1/1994 | Dage et al. | |
| 5,316,074 A | 5/1994 | Isaji et al. | |
| 5,333,678 A | 8/1994 | Mellum et al. | |
| 5,361,593 A | 11/1994 | Dauvergne | |
| 5,376,866 A | 12/1994 | Erdman | |
| 5,396,779 A | 3/1995 | Voss | |
| 5,402,844 A | 4/1995 | Elluin | |
| 5,465,589 A | 11/1995 | Bender et al. | |
| 5,497,941 A | 3/1996 | Numazawa et al. | |
| 5,501,267 A | 3/1996 | Iritani et al. | |
| 5,502,365 A | 3/1996 | Nanbu | |
| 5,524,442 A | 6/1996 | Bergmen, Jr. et al. | |
| 5,528,901 A | 6/1996 | Willis | |
| 5,562,538 A | 10/1996 | Suyama | |
| 5,586,613 A | 12/1996 | Ehsani | |
| 5,657,638 A | 8/1997 | Erdman et al. | |
| 5,682,757 A | 11/1997 | Peterson | |
| 5,782,610 A | 7/1998 | Ikeda | |
| 5,819,549 A | 10/1998 | Sherwood | |
| 5,896,750 A | 4/1999 | Karl | |
| 5,898,995 A | 5/1999 | Ghodbane | |
| 5,899,081 A | 5/1999 | Evans et al. | |
| 5,901,572 A | 5/1999 | Peiffer et al. | |
| 5,901,780 A | 5/1999 | Zeigler et al. | |
| 5,921,092 A | 7/1999 | Behr et al. | |
| 5,934,089 A | 8/1999 | Nakagawa et al. | |
| 5,982,643 A | 11/1999 | Phlipot | |
| 6,016,662 A | 1/2000 | Tanaka et al. | |
| 6,028,406 A | 2/2000 | Birk | |
| 6,038,877 A | 3/2000 | Peiffer et al. | |
| 6,038,879 A * | 3/2000 | Turcotte | F24F 1/022 62/325 |
| 6,059,016 A | 5/2000 | Rafalovich et al. | |
| 6,073,456 A | 6/2000 | Kawai et al. | |
| 6,111,731 A | 8/2000 | Cepynsky | |
| 6,112,535 A | 9/2000 | Hollenbeck | |
| 6,134,901 A | 10/2000 | Harvest et al. | |
| 6,152,217 A | 11/2000 | Ito et al. | |
| 6,205,795 B1 | 3/2001 | Backman et al. | |
| 6,205,802 B1 | 3/2001 | Drucker et al. | |
| 6,209,333 B1 | 4/2001 | Bascobert | |
| 6,213,867 B1 * | 4/2001 | Yazici | F24F 1/01 454/261 |
| 6,230,507 B1 | 5/2001 | Ban et al. | |
| 6,253,563 B1 | 7/2001 | Ewert et al. | |
| 6,276,161 B1 | 8/2001 | Peiffer et al. | |
| 6,282,919 B1 | 9/2001 | Rockenfeller et al. | |
| 6,351,957 B2 | 3/2002 | Hara | |
| 6,405,793 B1 | 6/2002 | Ghodbane et al. | |
| 6,411,059 B2 | 6/2002 | Frugier et al. | |
| 6,453,678 B1 | 9/2002 | Sundhar | |
| 6,457,324 B2 | 10/2002 | Zeigler et al. | |
| 6,467,279 B1 | 10/2002 | Backman et al. | |
| 6,474,081 B1 | 11/2002 | Feuerecker | |
| 6,530,426 B1 | 3/2003 | Kishita et al. | |
| 6,626,003 B1 | 9/2003 | Kortüm | |
| 6,684,863 B2 | 2/2004 | Dixon et al. | |
| 6,725,134 B2 | 4/2004 | Dillen et al. | |
| 6,745,585 B2 | 6/2004 | Kelm et al. | |
| 6,748,750 B2 | 6/2004 | Choi | |
| 6,758,049 B2 | 7/2004 | Adachi et al. | |
| 6,889,762 B2 | 5/2005 | Zeigler et al. | |
| 6,939,114 B2 | 9/2005 | Iwanami et al. | |
| 6,965,818 B2 | 11/2005 | Koenig et al. | |
| 6,981,544 B2 | 1/2006 | Iwanami et al. | |
| 7,150,159 B1 | 12/2006 | Brummett et al. | |
| 7,316,119 B2 | 1/2008 | Allen | |
| 7,350,368 B2 | 4/2008 | Heberle et al. | |
| 7,591,143 B2 | 9/2009 | Zeigler et al. | |
| 7,591,303 B2 | 9/2009 | Zeigler et al. | |
| 8,919,140 B2 | 12/2014 | Johnson et al. | |
| 2001/0010261 A1 | 8/2001 | Oomura et al. | |
| 2002/0026801 A1 | 3/2002 | Yamashita | |
| 2002/0078700 A1 | 6/2002 | Kelm et al. | |
| 2002/0084769 A1 | 7/2002 | Iritani et al. | |
| 2002/0108384 A1 | 8/2002 | Higashiyama | |
| 2002/0112489 A1 | 8/2002 | Egawa et al. | |
| 2002/0157412 A1 | 10/2002 | Iwanami et al. | |
| 2002/0157413 A1 | 10/2002 | Iwanami et al. | |
| 2003/0041603 A1 | 3/2003 | Tada et al. | |
| 2003/0105567 A1 | 6/2003 | Koenig et al. | |
| 2003/0106332 A1 | 6/2003 | Okamoto | |
| 2004/0168449 A1 | 9/2004 | Homan et al. | |
| 2005/0109499 A1 | 5/2005 | Iwanami et al. | |
| 2005/0161211 A1 | 7/2005 | Zeigler et al. | |
| 2005/0230096 A1 * | 10/2005 | Yamaoka | B60H 1/03 165/202 |
| 2005/0257545 A1 | 11/2005 | Ziehr et al. | |
| 2006/0102333 A1 | 5/2006 | Zeigler et al. | |
| 2006/0151163 A1 | 7/2006 | Zeigler et al. | |
| 2006/0151164 A1 | 7/2006 | Zeigler et al. | |
| 2007/0131408 A1 | 6/2007 | Zeigler et al. | |
| 2008/0110185 A1 | 5/2008 | Veettil et al. | |
| 2008/0156887 A1 * | 7/2008 | Stanimirovic | F24F 11/0086 236/12.1 |
| 2008/0196436 A1 * | 8/2008 | Connell | B60H 1/00378 62/323.3 |
| 2008/0196877 A1 | 8/2008 | Zeigler et al. | |
| 2009/0301702 A1 | 12/2009 | Zeigler et al. | |
| 2010/0218530 A1 | 9/2010 | Melbostad et al. | |
| 2011/0308265 A1 * | 12/2011 | Phannavong | F24F 12/001 62/160 |
| 2012/0247135 A1 * | 10/2012 | Fakieh | E03B 3/28 62/129 |
| 2013/0167577 A1 * | 7/2013 | Street | F24F 12/001 62/408 |
| 2013/0319630 A1 * | 12/2013 | Yamamoto | B60H 1/00764 165/42 |

(56) References Cited

U.S. PATENT DOCUMENTS

| | | | |
|---|---|---|---|
| 2014/0066572 A1 | 3/2014 | Corveleyn et al. | |
| 2014/0075973 A1* | 3/2014 | Graaf .............. | B60H 1/00328 62/115 |
| 2014/0290299 A1* | 10/2014 | Nakaya .............. | B60H 1/00028 62/324.6 |

FOREIGN PATENT DOCUMENTS

| | | |
|---|---|---|
| DE | 10 2005 004 950 A1 | 8/2006 |
| DE | 10 2010 054965 | 6/2012 |
| EP | 0963895 A2 | 12/1999 |
| EP | 1 024 038 A2 | 8/2000 |
| EP | 2048011 A1 | 4/2009 |
| FR | 2966391 A1 | 4/2012 |
| JP | 5032121 | 2/1993 |
| JP | H07186711 A | 7/1995 |
| JP | 2000-108651 | 4/2000 |
| JP | 2002-081823 | 3/2002 |
| JP | 2005044551 A | 2/2005 |
| JP | 2012017029 A | 1/2012 |
| WO | WO 89/09143 A1 | 10/1989 |
| WO | WO 99/61269 | 12/1999 |
| WO | WO 00/00361 | 1/2000 |
| WO | WO 2006/082082 | 8/2006 |

OTHER PUBLICATIONS

Bergstrom, Inc., International Search Report and Written Opinion, PCT/US2014/026687, 12 pgs.
Zeigler, Final Office Action, U.S. Appl. No. 13/661,519, Sep. 26, 2014, 23 pgs.
Alfa Laval Website, 115 Years in the USA, http://www.alfalaval.com/ecore-Java/WebObjects/ecoreJava.woa/wa/shoNode?siteNodelID=1668&cont . . . ; date last visited May 18, 2007; 1 page.
GEA, FlatPlate Heat Exchangers; GEA FlatPiate Inc.; website—http://www.flatplate.com/profile.html; date last visited Aug. 9, 2007; 3 pages.
Glacier Bay Inc., Glacier Bay's Home Page, page printed from a website, htt(?:i/web.archive.org/web/19990417062255/htt[2://www.glacierbay.com/, apparent archive date: Apr. 17, 1999, 1 page.
Glacier Bay Inc., Darpa/Glacier Bay ECS, pages printed from a website, httg://web.archive.org/web/19991104132941/wvvw . glacierbay.com/darQatxt. htm, apparent archive date: Nov. 4, 1999, 2 pages.
Glacier Bay Inc., Glacier Bay ECS DARPA Project—Final Report, pages printed from a website, httn://web.archive.or_gjweb/19991103001512/v•vww ,_g.Jacierbay.com/Darnhtm.htm, apparent archive date: Nov. 3, 1999, 9 pages.
Glacier Bay Inc., Glacier Bay ECS DARPA Project—Project Photos, pages printed from a website, httg://web.archive.org/web/1999 "1103012854/www .glacierbay.com/Dargghotos.htm, apparent archive date: Nov. 3, 1999, 2 pages.
Glacier Bay Inc., Glacier Bay ECS DARPA Project—Operational Video, page printed from a website, httQ://web.archive.orq/web/19991022221040/wvvw .qlacierbay.com/DarQvid.htm, apparent archive date Oct. 22, 1999; 1 page.
Glacier Bay Inc., R & D, pages printed from a website, htt ://web.archive.org/web/20000121130306/www.glacierbay.com/R&D.htm, apparent archive date: Jan. 21, 2000, 2 pages.

Glacier Bay Inc., Company History, pages printed from a website, httg://web.archive.org/web/20000301153828/www .g!acierbay.corn/History:.htrn, apparent archive date: Mar. 1, 2000; 2 pages.
Glacier Bay Inc., Contact, page printed from a website, httQ://web.archive.orq/web/19990508104511/W\"I!V .qlacierba:t.com/Contact.htm, apparent archive date: May 8, 1999; 1 page.
Michael Löhle, Günther Feuerecker and Ulrich Salzer; Non-Idling HVAC-module for Long Distance Trucks; SAE Technical Paper Series 1999-1-1193; International Congress and Exposition, Detroit, Michigan; Mar. 1-4, 1999; 8 pages.
Mahmoud Ghodbane; On Vehicle Performance of a Secondary Loop A/C System; SAE Technical Paper Series 2000-01-1270; SAE 2000 World Congress, Detroit, Michigan; Mar. 6-9, 2000; 6 pages.
Masami Konaka and Hiroki Matsuo; SAE Technical Paper Series 2000-01-1271; SAE 2000 World Congress, Detroit, Michigan; Mar. 6-9, 2000; 6 pages.
Frank Stodolsky, Linda Gaines, and Anant Vyas; Analysis of Technology Options to Reduce the Fuel Consumption of Idling Trucks; Paper-Center for Transportation Research, Energy Systems Division, Argonne National Laboratory,9700 South Cass Avenue, Argonne, Illinois 60439;Jun. 2000; 30 pages.
Paper No. 26 in IPR2012-00027, Jun. 11, 2013, 12 pgs. (U.S. Pat. No. 7,591,303).
Patricia Gardie and Vincent Goetz; Thermal Energy Storage System by Solid Absorption for Electric Automobile Heating and Air-Conditioning; Paper; 5 pages.
TropiCool No-idle Heating & Cooling, 110V/12V High-efficiency, Self-contained, Electrified Heating/AC System; ACC Climate Control Brochure, Elkhart, Indiana; 2005, 1 page.
TropiCool Power Plus, More comfort. More efficiency. More options; ACC Climate Control Brochure, Elkhart, Indiana; 2006, 3 pages.
Packless Industries, the leader in refrigerant to water coaxial heat exchangers, flexible hoses and sucti . . . ; website—http://www.packless.com/profile.htmle: date last visited Aug. 9, 2007; 1 page.
Zeigler, Office Action, U.S. Appl. No. 13/661,519, dated Mar. 11, 2013, 8 pgs.
Zeigler, Final Office Action, U.S. Appl. No. 13/661,519, dated Sep. 18, 2013, 15 pgs.
Zeigler, Office Action, U.S. Appl. No. 13/661,519, dated Apr. 9, 2014, 20 pgs.
Bergstrom Inc., International Search Report and Written Opinion, PCT/US2014/026683, Jul. 3, 2014, 9 pgs.
Bergstrom, Inc., International Preliminary Report on Patentability, PCT/US2014/026687, Sep. 15, 2015, 7 pgs.
Bergstrom, Inc., International Search Report and Written Opinion, PCT/US2013/068331, Nov. 7, 2014, 9 pgs.
Bergstrom, Inc., Communication Pursuant to Rules 161(2) and 162 EPC, EP14717604.4, Oct. 23, 2015, 2 pgs.
Bergstrom, Inc., Communication Pursuant to Rules 161(2) and 162 EPC, EP14722438.0, Nov. 2, 2015, 2 pgs.
Connell, Office Action, U.S. Appl. No. 14/209,877, Nov. 27, 2015, 19 pgs.
Zeigler, Office Action, U.S. Appl. No. 13/661,519, Oct. 28, 2015, 20 pgs.
Bergstrom, Inc., International Preliminary Report on Patentability, PCT/US2013/068331, May 10, 2016, 6 pgs.
Bergstrom, Inc., Communication Pursuant to Rules 161(2) and 162 EPC, EP13795064.8, Jun. 22, 2016. 2 pgs.
Connell, Final Office Action, U.S. Appl. No. 14/209,877, Jun. 22, 2016, 17 pgs.
Zeigler, Notice of Allowance, U.S. Appl. No. 13/661,519, Jun. 17, 2016, 8 pgs.

* cited by examiner

AIR CONDITIONING SYSTEM UTILIZING HEAT RECOVERY VENTILATION FOR FRESH AIR SUPPLY AND CLIMATE CONTROL

CROSS-REFERENCE

This application claims priority to U.S. Provisional Application No. 61/778,854, filed Mar. 13, 2013, the contents of which are incorporated herein by reference in its entirety.

FIELD OF THE INVENTION

This invention generally relates to air conditioning systems, and more particularly to air conditioning systems utilized in motor vehicles.

BACKGROUND OF THE INVENTION

There have been various developments in recent years to make all aspects of motor vehicles more efficient. Such increases in efficiency reduce cost and have a positive environmental impact. Large vehicles such as tractor-trailers that are heavily relied on to handle contemporary shipping demands for goods and raw materials are no exception. Indeed, there have been many notable advances with these types of vehicles to make the same more efficient. However, as the cost of fuel continues to rise, there is a continuous effort to offset this increased operating cost by utilizing leaner, lower-cost tractor-trailer type vehicles.

One aspect of the aforementioned tractor-trailer vehicles that has received a significant amount of attention from a cost reduction perspective is the heating, ventilation, and air conditioning (HVAC) system utilized therein. As one example, there has been a growing use of HVAC systems in tractor-trailers that utilize both an engine operated and an electrically operated configuration to provide heating/cooling. Such a system advantageously provides for HVAC service when the engine is running while a driver is operating the vehicle, as well as HVAC service when the engine is not running while a driver is resting in the vehicle. Such a system can be found at U.S. Pat. No. 6,889,762, the entire teachings and disclosure of which is hereby incorporated in its entirety by reference thereto. As another example, there has been a growing desire to make each of the various components within an air conditioning loop more efficient, by improving their thermal performance and power consumption.

While contemporary HVAC systems have vastly improved driver comfort and vehicle flexibility, there is an ongoing need to make such systems more efficient. The implementations described herein provide various improvements upon the above described HVAC systems. These and other advantages will be apparent from the description provided herein.

BRIEF SUMMARY OF THE INVENTION

One way to increase the efficiency of an HVAC system is to provide, as input to the HVAC system, air having an inlet temperature and relative humidity that will reduce the thermal load placed on the HVAC system. Similarly, in order to maximize user comfort and safety, it is beneficial to be able to control how much fresh air and how much recirculated air (e.g., stale air from the conditioned space) is introduced to a conditioned space. However, the particular target conditions for a conditioned space are highly variable, and depend on many factors, such as user preference, solar loading, time-of-day, and so on. Similarly, the ambient conditions at any given time (e.g., the current interior temperature/humidity, current exterior temperature/humidity) are extremely variable.

Thus, it would be beneficial to provide a dynamic heat and/or energy recovery ventilation systems and methods that can adjust, in real-time, to the changing target demands and environmental conditions that a vehicle HVAC system might experience.

In accordance with some implementations, a vehicle ventilation module is provided. The vehicle ventilation module comprises a return air duct having a return air inlet and a return air outlet downstream of the return air inlet; a fresh air duct having a fresh air inlet and a fresh air outlet downstream of the fresh air inlet; and a heat exchanger thermally coupled to the return air duct and the fresh air duct, wherein the heat exchanger is upstream of the return air outlet and the fresh air outlet, and downstream of the return air inlet and the fresh air inlet. The ventilation module further comprises a first door joining the return air duct and the fresh air duct upstream of the heat exchanger; and a second door joining the return air duct and the fresh air duct downstream of the heat exchanger. The first door and the second door are operable to selectively open and close in order to allow air to pass between the fresh air duct and the return air duct.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings. In the drawings.

DETAILED DESCRIPTION OF THE INVENTION

Figure 1:
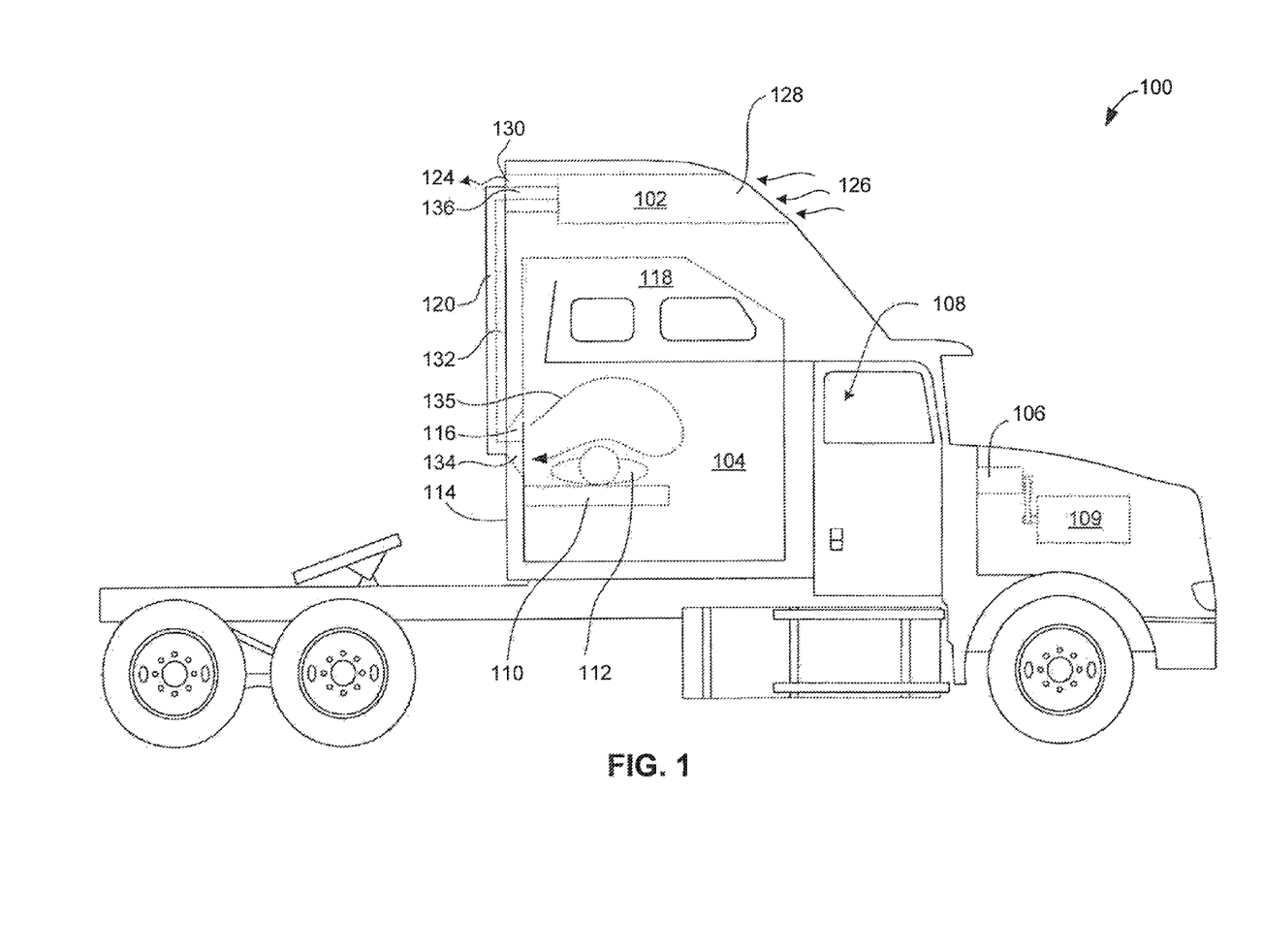
FIG. 1 is a schematic representation of an embodiment of a vehicle ventilation module that utilizes heat recovery ventilation for fresh air supply and climate control according to the teachings of the present invention.

FIG. 1 is a schematic representation of an embodiment of a vehicle 100, such as an over-the-road commercial truck, with a ventilation module that utilizes heat recovery ventilation for fresh air supply. While the figures and description contemplate an over-the-road commercial vehicle, those skilled in the art will recognize that the systems and methods described herein are equally applicable to other types of vehicles.

In some embodiments the vehicle includes a cab 108. A vehicle operator may operate the vehicle 100 from within the cab 108. Some embodiments also include a sleeping area 104 containing one or more beds 110 on which the vehicle operator 112 or passenger may sleep or rest. In some embodiments, the sleeping area 104 is separated from the cab 108 by a retractable curtain or door, which may thermally separate the cab 108 from the sleeping area 104. In some embodiments, the sleeping area 104 is located within the outer shell of the vehicle cab between a back end wall 114, and a pair of sidewalls 118 extending generally perpendicular to the back end wall 114. The bed 110 is typically provided along the back end wall 114 of the sleeping area 104 with one side adjacent the back end wall 114 and two other sides or ends adjacent the sidewalls 118. Thus, three sides of the bed 110 are typically encompassed or surrounded by the shell of the sleeping area 104. This leaves an open side of the bed 110 along the front where a person can maneuver into and out of the bed 110. The bed 110 is typically elevated a few feet above the floor of the sleeping area 110.

In some embodiments, the thermal environment of the cab 108 is controlled with a primary ventilation module 106 (e.g. a heater and/or air conditioner). In some embodiments, this ventilation module 106 is a traditional belt-driven air-conditioning system mechanically coupled to the vehicle's engine 109 to operate the primary ventilation module 106 when the engine 109 is running.

In some embodiments, the vehicle 100 includes an auxiliary ventilation module 102 (e.g. a heater and/or air conditioner) to control the thermal environment of the sleeping area 104. It should, however, be appreciated that the auxiliary ventilation module 102 may heat or cool the cab 108, or any other area of the vehicle, with or without the assistance of the primary ventilation module 106.

The auxiliary ventilation module 102 includes an air outlet 116 that delivers thermally conditioned air to the sleeping area 104, such as over the bed 110, as shown. Where the sleeping area 104 includes more than one bunk bed, two outlets, one for each bed, may be provided. In the illustrated embodiment, the outlet 116 is provided along the back end wall 114. In other arrangements, the outlet 116 may be provided through the ceiling, towards one or both of the corners between the back end wall 114 and side walls 118; along the side walls 118; or at any other suitable location wherein thermally conditioned air is expelled into the sleeping area 104. The auxiliary ventilation module 102 may be mounted along the ceiling, above the cab, along the back end wall 114, beneath the bed 110, or in any other suitable location.

In some embodiments, the auxiliary ventilation module 102 includes a fresh air duct having an air inlet 128 for receiving fresh air 126 from outside the cab and sleeping area, and a fresh air outlet 130 for exhausting air 124 received through the fresh air inlet 128. In some embodiments, the fresh air inlet 128 is a scoop to direct fresh air into the fresh air duct while the vehicle is moving forward. In some embodiments, the auxiliary ventilation module 102 also includes a return duct 120 having a return air inlet 134 and a return air outlet 136.

In use, thermally conditioned air is supplied to the interior of the vehicle 100 via a supply duct 132 and supply duct outlet 116. The air circulates within the vehicle, as shown by arrow 135, and is thereafter drawn into the return air inlet 134, passes along the return duct 120 to the return duct outlet 136 where it is received by the auxiliary ventilation module 102 to be reconditioned or exhausted.

Figure 2A:
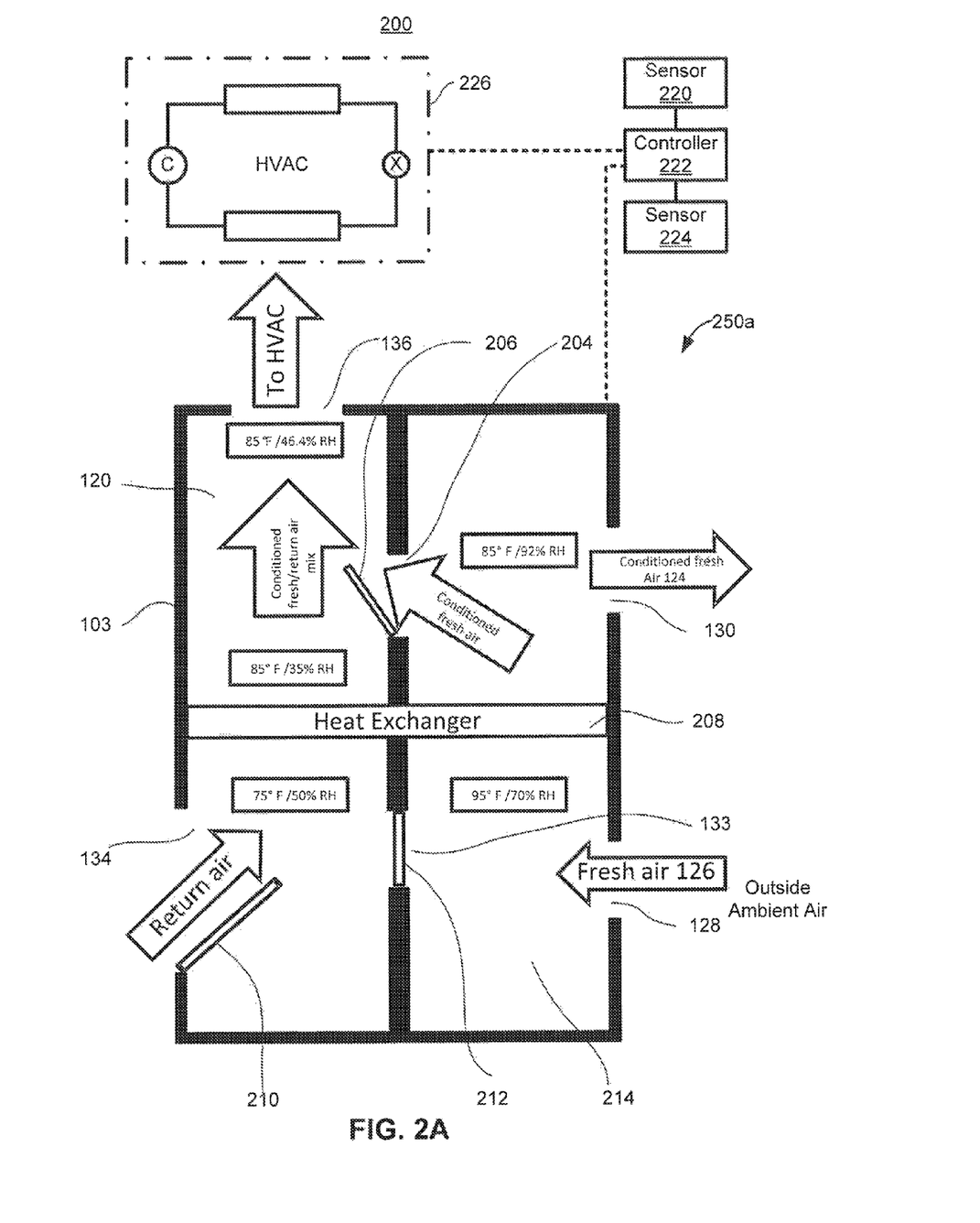
FIG. 2A is a schematic representation of an embodiment of the vehicle ventilation module in a first mode of operation.

FIG. 2A is a schematic representation of an embodiment of a system 200 containing a vehicle ventilation module 103 shown in a first mode of operation 250*a*. (The vehicle ventilation module 103 is an exemplary embodiment of the vehicle ventilation module 102 shown in FIG. 1.) The system 200 includes any suitable heating, ventilation, and air conditioning (HVAC) system 226, such as a conventional vapor-compression refrigerant loop having a compressor, condenser, expansion valve, evaporator, refrigerant lines, fittings, condenser coils, valves, or other components for a vehicle based HVAC system. The HVAC system 226 may provide heated air, cooled air, or both, and may also include multiple air conditioning circuits or loops. For example, the HVAC system 226 may include a primary circuit with a belt driven, engine operated compressor, and a secondary circuit with an electrically driven compressor that is not dependent upon an engine for its operation. Either or both of the aforementioned circuits may be utilized to provide temperature controlled air in the system 200.

The system 200 also includes a vehicle ventilation module 103 positioned upstream from HVAC system 226. As will be described in greater detail below, the vehicle ventilation module 103 is responsible for pre-treating the air supplied to the HVAC system 226, which will ultimately be delivered to the passenger compartment (or other interior compartment) of the vehicle.

As will be explained below, the vehicle ventilation module 103 utilizes heat recovery and energy recovery ventilation to provide fresh air to the interior of the vehicle while maintaining and improving climate control. The vehicle ventilation module 103 can also transfer heat and humidity between the inside of the vehicle and the exterior of the vehicle to provide more efficient cooling and/or heating of the interior of the vehicle. The aforementioned functionality may be utilized for multi-season comfort and efficiency gains by using the lowest inlet temperature available when in a cooling mode, or utilizing heat recovery to maximize heating efficiency.

Those skilled in the art will recognize that when the HVAC system 226 is operated using an electrically driven compressor, the vehicle ventilation module 103 advantageously reduces the thermal load on the HVAC system 226, ultimately reducing the electrical power required to operate the HVAC system 226.

The system 200 also includes a controller 222 in communication with at least one sensor 220 located within the interior of the vehicle, as well as at least one sensor 224 located on the exterior of the vehicle. Sensors 220, 224 are responsible for communicating climate based information to the controller 222. As such, these sensors 220, 224 may be temperature sensors, thermostats, humidity sensors (e.g., hygrometers, sling psychrometers, etc.), air speed sensors, air quality sensors for monitoring pollutant levels such as NOx and CO, or the like.

In some embodiments, the controller 222 is also in communication with HVAC system 226, as well as the vehicle ventilation module 103, and is operable to control the respective functionalities thereof. In some embodiments, the controller 222 sends a control signal to the HVAC system 226 to initiate the operation thereof, and more particularly, initiate the operation of the engine and/or electrically operated circuit therein. In some embodiments, the controller 222 sends a control signal to the vehicle ventilation module 103 to control the amount of fresh air input into the interior of the vehicle from the vehicle ventilation module 103, as described below.

In those embodiments where the interior sensor 220 includes an air quality sensor and such a sensor detects an unacceptable amount of pollutants (e.g. NOx and/or CO) in the interior of the vehicle, the controller 222 sends a control signal that allows the input of fresh air into the vehicle, either through vehicle ventilation module 103, or by opening a door, window, or vent on the vehicle in order to allow the interior air to be exchanged with fresh exterior air. In yet another embodiment, where the interior sensor 220 includes an air quality sensor and such a sensor detects an unacceptable amount of in interior pollutants, the controller 222 may also turn on an interior air purification device (not shown), e.g., an air ionizer, which removes various forms of viruses, bacteria, pet dander, mold, mildew, or the like.

In some embodiments, where the interior sensor 220 determines that the temperature of the interior air is warmer than the exterior air (as measured by the exterior sensor 224), and the desired interior temperature is to be lowered, this same functionality is used to exchange the warmer interior air with the cooler exterior air.

The vehicle ventilation module 103 includes a return air duct 120 that includes a return air inlet 134 and a return air outlet 136 downstream of the return air inlet 134. The return air outlet 136 is thermally (and typically fluidly) coupled to the HVAC system 226. The vehicle ventilation module 103 also includes a fresh air duct 214 having a fresh air inlet 128 and a fresh air outlet 130 downstream of the fresh air inlet 128. An example of the placement and type of such ducts, inlets, and outlets is shown in FIG. 1.

The vehicle ventilation module 103 also includes a heat exchanger 208 thermally coupled to the return air duct 120 and the fresh air duct 214. The heat exchanger 208 is disposed upstream of the return air outlet 136 and the fresh air outlet 130, and downstream of the return air inlet 134 and the fresh air inlet 128. In other words, the heat exchanger 208 separates the inlets 134, 128 from the outlets 136, 130. The heat exchanger 208 may be an air-to-air heat exchanger as one example, although other types of heat exchangers could also be utilized.

The heat exchanger 208 allows heat to be transferred between the return duct 120 and the fresh air duct 214 without the air in the ducts having to make contact (although as shown below, the air in each duct mixes in certain modes). In some embodiments, the heat exchanger 208 is a metallic radiator that has a high thermal conductivity.

The vehicle ventilation module 103 also includes a first door 212 joining the return air duct 120 and the fresh air duct 214 upstream of the heat exchanger 208. These doors are otherwise known as controllable vents or dampeners. Finally, the vehicle ventilation module 103 includes a second door 206 joining the return air duct 120 and the fresh air duct 214 downstream of the heat exchanger 208. The first door 212 and the second door 206 are operable to selectively open and close in order to allow air to pass between the fresh air duct 214 and the return air duct 120. These doors 212, 206 are selectively controlled (e.g., opened and closed) by signals sent from the controller 222. In some embodiments, each door can be opened by incremental amounts to allow more or less fresh air into the return duct 120, or more or less return air into the fresh air duct 214. By controlling the doors, the ventilation module allows for the recovery of a percentage of energy normally lost through the fresh air outlet 130, so as to allow the HVAC system 226 to handle increased thermal load required for heating or cooling fresh air without requiring a dramatic increase in the thermal capacity of the HVAC system 226.

In some embodiments, optional additional doors are provided, such as the third door 210 at the return air inlet 134. Closing this door prevents return air from recirculating into the interior of the vehicle. Although not shown, when the door 210 is closed, return air is routed or exhausted to the exterior of the vehicle, rather than through the ventilation module 103. Other doors may be provided at the other inlets 128 and outlets 136, 130. For example, a fourth door such as fourth door 243 illustrated in FIG. 2C is located at the fresh air inlet 128. The fourth door is also selectively controlled (e.g., opened and closed) by signals sent from the controller 222 in order to control the amount of fresh air being introduced into the system. In some embodiments, the fourth door can be opened by incremental amounts to allow more or less fresh air into the fresh air duct 214. In some embodiments, the amount of fresh air that is introduced into the fresh air duct 214 (as modulated by the fourth door) is determined by the controller 222 based on any appropriate consideration (e.g., interior or exterior air quality levels, interior or exterior temperatures, interior or exterior humidity levels, and the like).

Also in some embodiments, one or more fans are provided at the inlets and outlets 134, 128, 204, 130, 133, 136 to assist in moving air through the inlets, outlets or ducts. In other embodiments, a flue (or Venturi tube) is connected to one or more of the outlets 136, 130 to assist in drawing air through the return duct 120 and/or fresh air duct 214. By way of illustration. FIG. 2C shows fan 241 provided at inlet 128, and flue 242 at outlet 130.

Figure 2B:
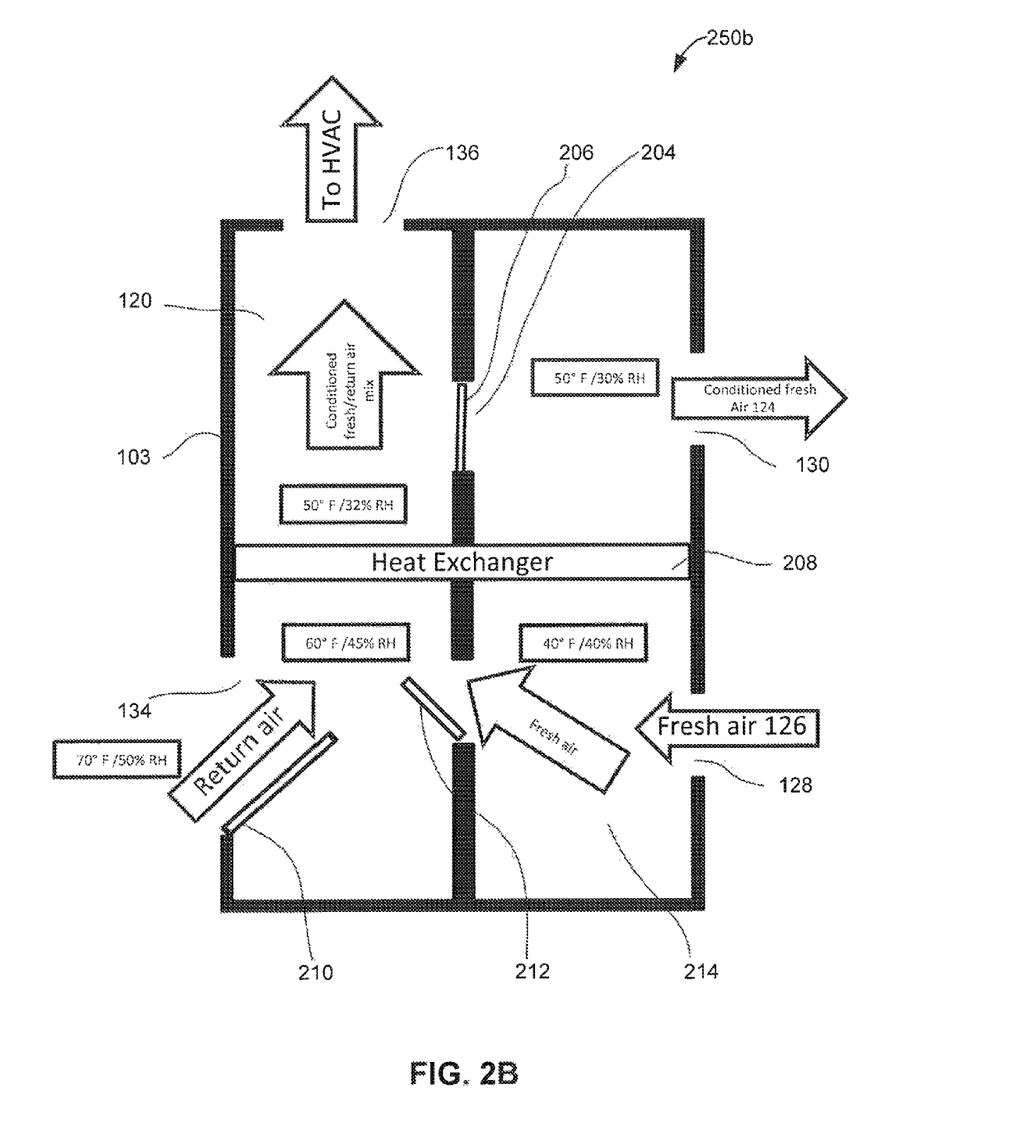
FIG. 2B is a schematic representation of the vehicle ventilation module of FIG. 2A, shown in a second mode of operation.
Figure 2C:
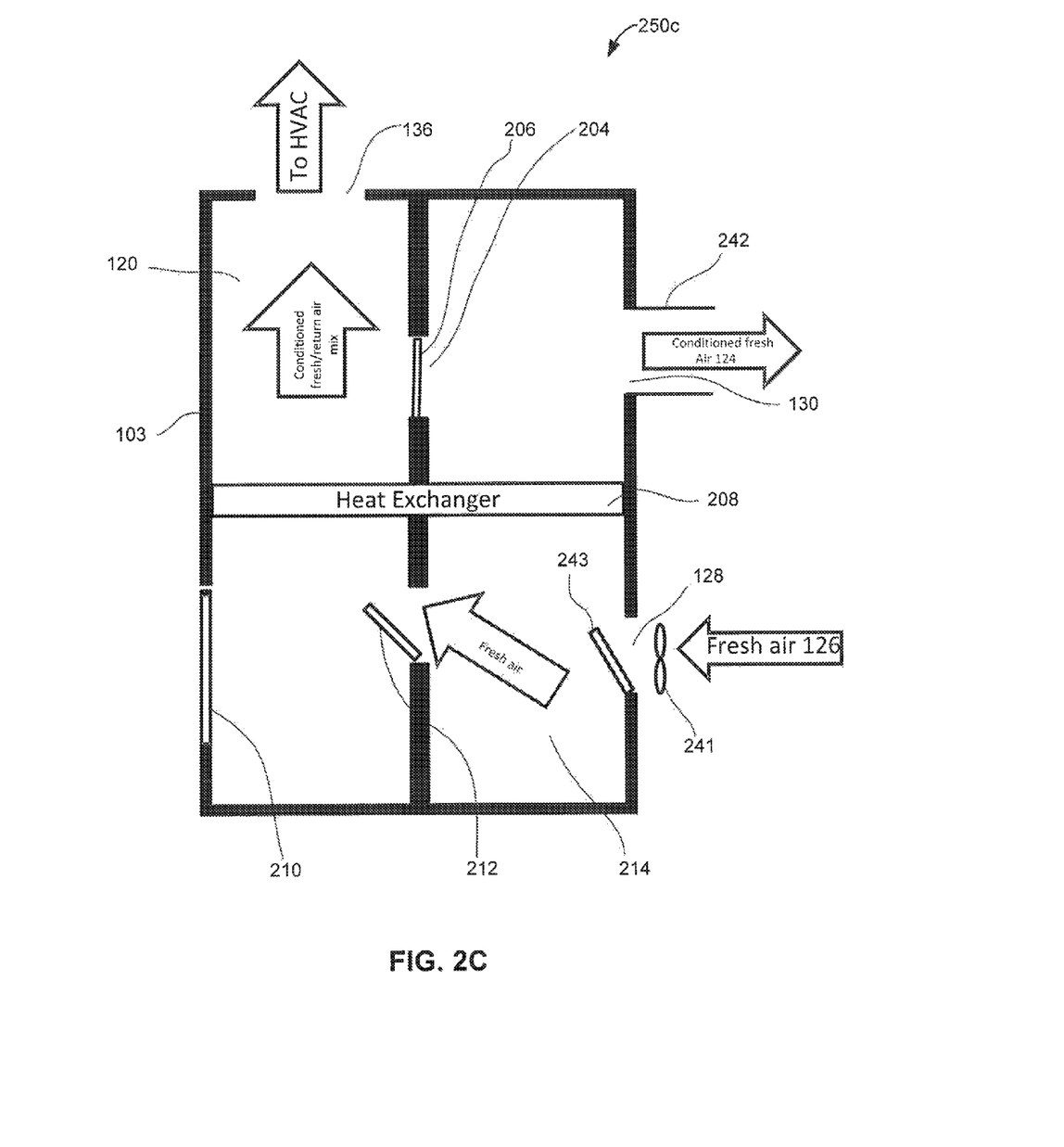
FIG. 2C is a schematic representation of the vehicle ventilation module of FIGS. 2A and 2B, shown in a third mode of operation.

FIG. 2B is a schematic representation of the vehicle ventilation module 103 of FIG. 2A, shown in a second mode of operation 250b, while FIG. 2C is a schematic representation of the vehicle ventilation module 103 of FIGS. 2A and 2B, shown in a third mode of operation 250c. The first to third modes of operation are discussed below with respect to FIG. 3.

Figure 3:
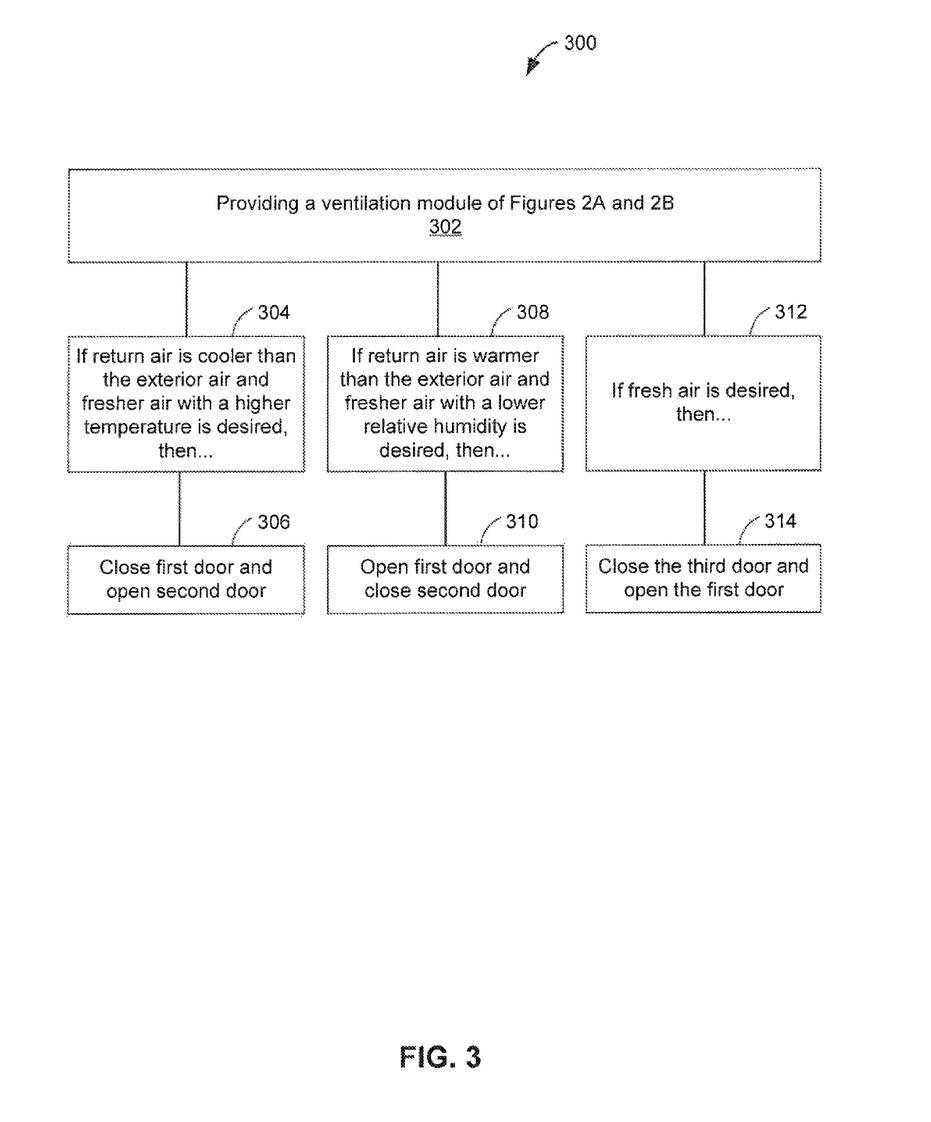
FIG. 3 is a flow chart of a method for conditioning air provided to an interior compartment of a vehicle.

FIG. 3 is a flow chart 300 of a method for conditioning air provided to an interior compartment of a vehicle. Initially, a ventilation module, such as ventilation module 102, 103, 105, and/or 107 of FIGS. 1, 2A-2C, and 4-5, is provided (302) for a vehicle. In a first mode of operation, a controller, such as controller 222 of FIG. 2A, determines: (i) it would be beneficial to provide the HVAC system with air that is at a higher temperature and/or provide the HVAC system with fresh air, and (ii) that the return air is cooler and/or has a lower relative humidity than the exterior air (304). The controller then closes the first door 212 (FIG. 2A) (or ensures that it is already closed), and opens the second door 206 (FIG. 2A) (or ensures that it is already open) (306) as shown in FIG. 2A. For example, as shown in FIG. 2A, the first door 212 is closed and the second door 206 is open when the return air is 75 degrees Fahrenheit and 50% relative humidity, and the temperature of the fresh air outside is 95 degrees Fahrenheit and 70% relative humidity. By closing the first door 212 and opening the second door 206 under these conditions, the fresh air in the fresh air duct 214 passes over the heat exchanger 208 that has been cooled by the lower temperature return air, thereby transferring some of its heat to the heat exchanger 208. The return air in the return air duct 120 also passes over the heat exchanger 208, thereby raising the temperature of the return air to 85 degrees Fahrenheit with a 35% relative humidity. Conditioned fresh air that had its temperature lowered from 95 degrees Fahrenheit, and 70% relative humidity, to 85 degrees Fahrenheit, and 92% relative humidity, by passing over the heat exchanger 208, is mixed with the conditioned return air by passing through the second door 206. Finally, the conditioned mixture of fresh and return air at 85 degrees Fahrenheit, and 46.4% relative humidity, is sent to the HVAC system, which may or may not need to further raise or lower the temperature of the air before it is sent to the interior of the vehicle.

In a second mode of operation, the controller, such as controller 222 of FIG. 2A, determines that: (i) it would be beneficial to provide the HVAC system with fresh air and/or with air having a lower temperature and/or relative humidity, and (ii) the return air is warmer and/or has a higher relative humidity than the exterior air (308). The controller then closes the second door 206 (FIG. 2B) (or ensures that it is already closed), and opens the first door 212 (FIG. 2B) (or ensures that it is already open) (310), as shown in FIGS. 2B and 3. For example, as shown in FIG. 2B, return air entering the return air duct is at 70 degrees Fahrenheit, and 50% relative humidity. The fresh air 126 introduced into the fresh air duct 214 is at 40 degrees Fahrenheit, and 40% relative humidity. The fresh air passes through the opening provided by the open first door 212 and is mixed with the return air to condition the return air to 60 degrees Fahrenheit, and 45% relative humidity. Both the partially conditioned return air in the return duct and some of the fresh air in the fresh air duct pass over the heat exchanger 208. This drops the temperature and/or relative humidity of the return air from 60 degrees Fahrenheit, and 45% relative humidity to 50 degrees Fahrenheit, and 32% relative humidity. This conditioned cooler return air is then passed to the HVAC system, which may not need to further raise or lower the temperature of the air before it is sent to the interior of the vehicle. The conditioned fresh air that passed over the heat exchanger is now at 50 degrees Fahrenheit, and 30% relative humidity, and is exhausted to the exterior of the vehicle.

In a third mode of operation, the controller, such as controller 222 of FIG. 2A, determines that the system requires introducing a high percentage (e.g., 80-100%) fresh air into the interior of the cabin (312). The controller then closes (or partially closes) the third door 210 (FIG. 2C) (or ensures that it is already closed or partially closed), and opens the first door 212 and/or the second door 206 (or ensures that they are already open) (314), as shown in FIG. 2C. By closing or opening the third door 210, the controller can control the amount of return air that is recirculated.

In some embodiments, the doors include appropriate sealing, or in the alternative, a valve, variable air flow device, or a damper. Those skilled in the art will recognize that various configurations in this regard are possible. Furthermore, additional doors or flow routing components may be included.

Figure 4:
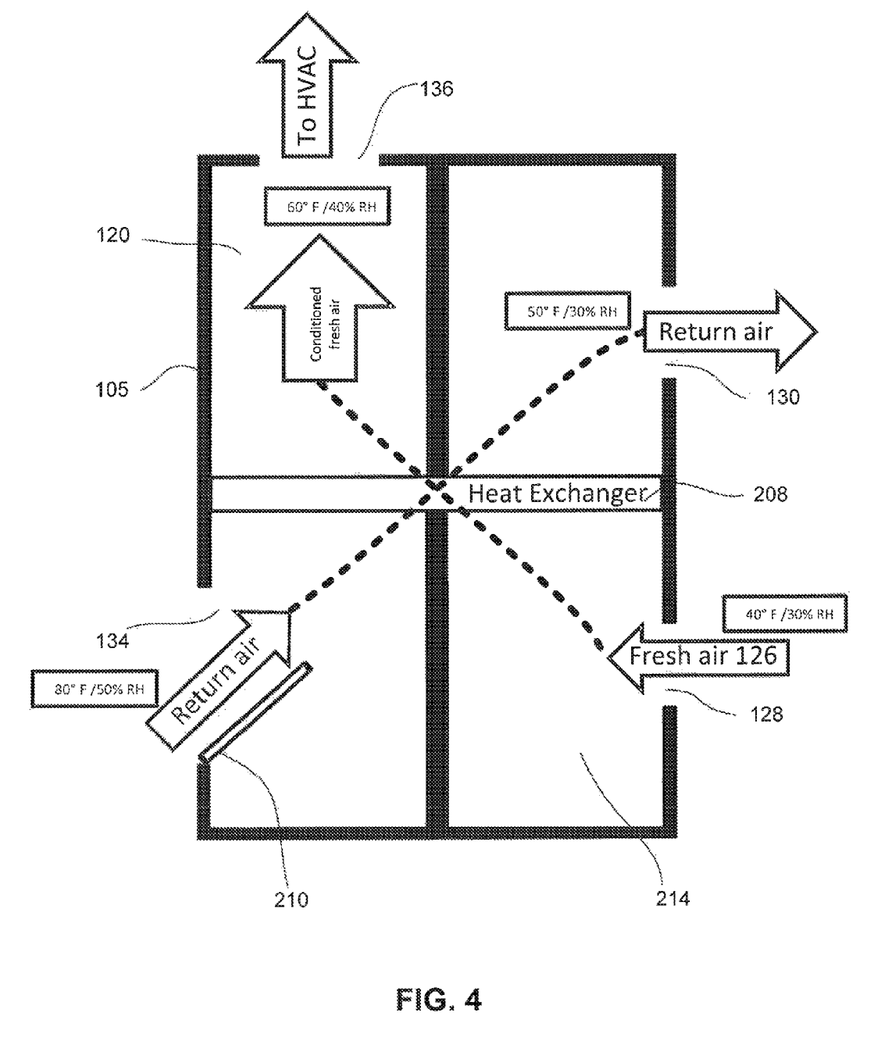
FIG. 4 is a schematic view of another embodiment of an air conditioning system utilizing heat recovery ventilation for fresh air supply and climate control according to the teachings of the present invention.

Turning now to FIG. 4, another vehicle ventilation module 105 is illustrated. (The vehicle ventilation module 105 is an exemplary embodiment of the vehicle ventilation module 102 shown in FIG. 1.) In this embodiment, doors 212, 206, which are included in FIGS. 2A-2C, are omitted. The other components of the vehicle ventilation module 105 are substantially the same as those described above with respect to the vehicle ventilation module 102, and the details of those components are not reproduced here. Moreover, for ease of reference, the same reference numbers are used for components that are common between the ventilation modules 102 and 105.

In the ventilation module 105, flow directing elements including but not limited to fans, dampers, valves, etc. are utilized to pull all of the return air passing through return air inlet 134 through heat exchanger 208 and out of fresh air outlet 130. Drawing the return air through the heat exchanger 208 will cause some of the heat of the return air to be transferred to the heat exchanger 208. Additional flow directing elements including but not limited to fans, dampers, valves, etc. are also situated to route all of the fresh air received through the fresh air inlet 128 through heat exchanger 208 and out of return air outlet 136. With this operation, heat will be extracted from the return air, through the heat exchanger 208, and transferred to the fresh air, resulting in pre-heated fresh air being sent to the HVAC system 226.

Specifically, as shown in FIG. 4, if the return air entering the return air duct 120 is at 80 degrees Fahrenheit, and 50% relative humidity, and the fresh air entering the fresh air duct 214 is at 40 degrees Fahrenheit, and 30% relative humidity, the heat exchanger 208 operates to increase the temperature of the incoming fresh air to 60 degrees Fahrenheit, and 40% relative humidity, thus reducing the thermal load placed on the HVAC system 226 without requiring any return air to be reintroduced into the HVAC system 226.

Figure 5:
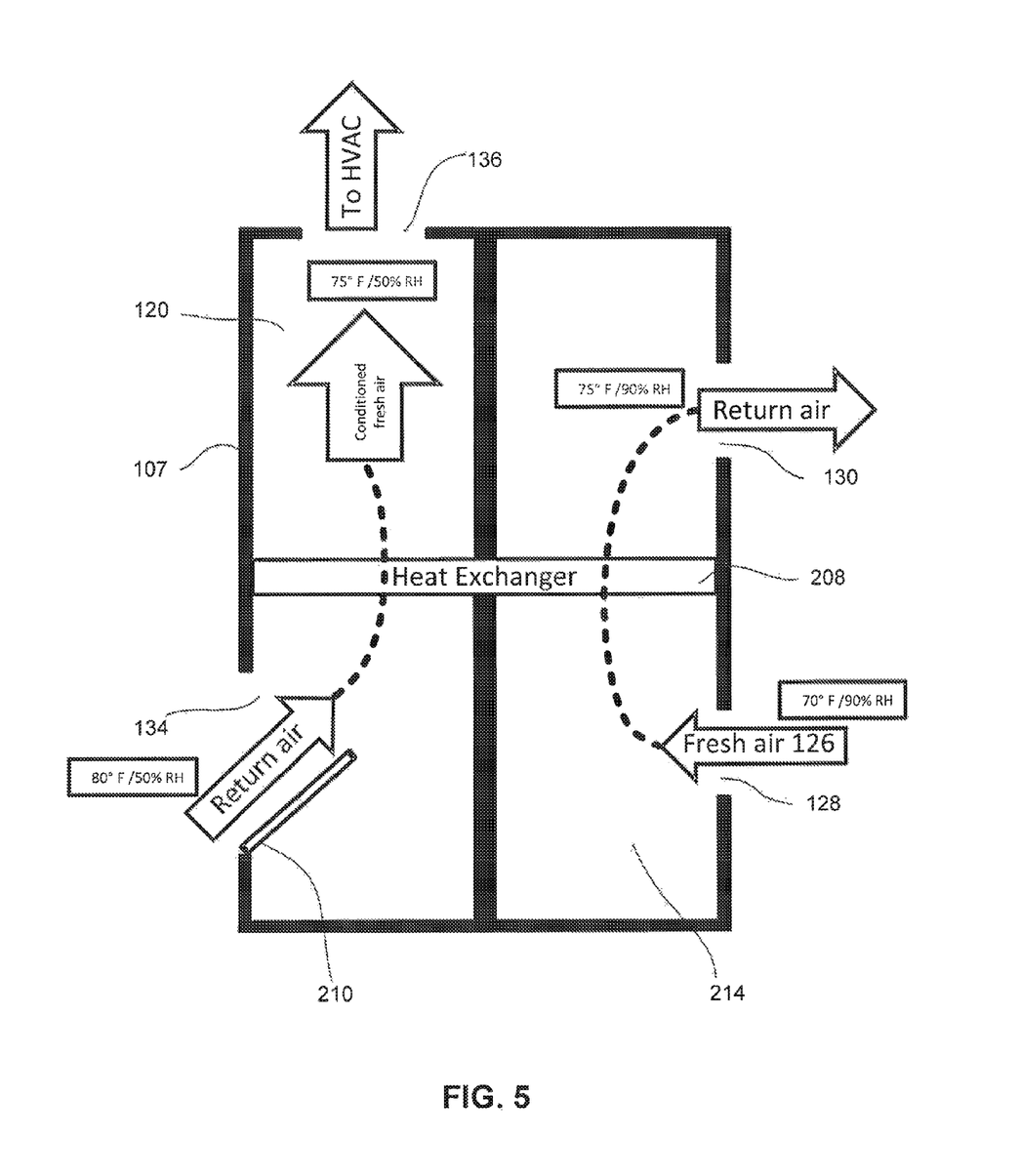
FIG. 5 is a schematic view of another embodiment of an air conditioning system utilizing heat recovery ventilation for fresh air supply and climate control according to the teachings of the present invention.

Turning now to FIG. 5, another vehicle ventilation module 107 is illustrated. (The vehicle ventilation module 107 is an exemplary embodiment of the vehicle ventilation module 102 shown in FIG. 1.) In this embodiment, doors 212, 206, which are included in FIGS. 2A-2C, are omitted. The other components of the vehicle ventilation module 107 are substantially the same as those described above with respect to the vehicle ventilation module 102, and the details of those components are not reproduced here. Moreover, for ease of reference, the same reference numbers are used for components that are common between the ventilation modules 102 and 107.

In this embodiment, fresh air is not utilized as supply air (i.e., no fresh air is introduced into the return air stream in the ventilation module 107). Rather, the fresh air is utilized to remove heat from heat exchanger 208, and is then exhausted through the fresh air outlet 130. This operation allows for the return air passing through return air inlet 134 to undergo heat transfer as it passes through heat exchanger 208, ultimately reducing its temperature. This reduced temperature air is then routed through return air outlet 136 to HVAC system 226. This "pre-cooled" air presents a lower thermal load on HVAC system 226.

For example, as shown in FIG. 5, if the return air entering the return air duct 120 is at 80 degrees Fahrenheit, and 50% relative humidity, and the fresh air entering the fresh air duct 214 is at 70 degrees Fahrenheit, and 90% relative humidity, the heat exchanger 208 operates to reduce the temperature of the recirculating return air to 75 degrees Fahrenheit, and 50% relative humidity, thus reducing the thermal load placed on the HVAC system 226 without requiring any fresh air to be introduced into the HVAC system 226.

FIGS. 4-5 depict ventilation modules 105, 107 that do not include the doors 212, 206 that are shown in the ventilation module 103 of FIGS. 2A-2C. In some embodiments, however, the ventilation modules 105 and 107 include the doors 212, 206. Indeed, in some embodiments, the ventilation modules 105 and 107 represent additional modes of operation of the ventilation module 103 where both the doors 212 and 206 are closed. More particularly, in some embodiments, the modes of operation shown in FIGS. 4 and 5 are achieved using the ventilation module 103 shown in FIGS. 2A-2C by closing the doors 212, 206, and manipulating one or more flow directing elements (e.g., fans, dampers, valves, etc.) of the ventilation module 103 and/or the heat exchanger 208 in order to achieve the required flow characteristics of the return air and the fresh air.

Those skilled in the art will recognize that the system(s) described above may be supplied as a stand-alone combined system including HVAC system 226 and ventilation module 102. Alternatively, ventilation module 102 may be supplied as an add-on component to an existing HVAC system 226. Moreover, all illustrated temperature and humidity values are for exemplary purposes only, and are not necessarily representative of actual temperature or humidity values, nor do the necessarily accurately reflect the thermal performance of the systems described or any of the components of the systems.

All references, including publications, patent applications, and patents cited herein are hereby incorporated by reference to the same extent as if each reference were individually and specifically indicated to be incorporated by reference and were set forth in its entirety herein.

In the foregoing discussion, plural instances are, optionally provided for components, operations, or structures described herein as a single instance. Finally, boundaries between various components, operations, and data stores are somewhat arbitrary, and particular operations are illustrated in the context of specific illustrative configurations. Other allocations of functionality are envisioned and optionally fall within the scope of the implementation(s). In general, structures and functionality presented as separate components in the example configurations are, optionally, implemented as a combined structure or component. Similarly, structures and functionality presented as a single component are, optionally, implemented as separate components. These and other variations, modifications, additions, and improvements fall within the scope of the implementation(s).

It will also be understood that, although the terms "first," "second," are, in some circumstances, used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" is, optionally, construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter is, optionally, practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A vehicle ventilation module comprising:
   a return air duct having a return air inlet and a return air outlet downstream of the return air inlet;
   a fresh air duct having a fresh air inlet and a fresh air outlet downstream of the fresh air inlet;
   a heat exchanger thermally coupled to the return air duct and the fresh air duct, wherein the heat exchanger is upstream of the return air outlet and the fresh air outlet, and downstream of the return air inlet and the fresh air inlet;
   a first door joining an upstream portion of the return air duct upstream of the heat exchanger and an upstream portion of the fresh air duct upstream of the heat exchanger, and
   a second door joining a downstream portion of the return air duct downstream of the heat exchanger and a downstream portion of the fresh air duct downstream of the heat exchanger,
   wherein the first door and the second door are operable to selectively open and close to allow air to pass between the fresh air duct and the return air duct; and
   control circuitry configured to:
      operate the vehicle ventilation module in a first mode of operation, including having the first door closed and the second door open, whereby air received through the fresh air inlet is drawn through the heat exchanger in the fresh air duct and a portion of the air drawn through the heat exchanger is drawn into the return air duct via the second door,
      operate the vehicle ventilation module in a second mode of operation, including having the first door opened and the second door closed, whereby a first portion of air received through the fresh air inlet is drawn into the return air duct and drawn through the heat exchanger in the return air duct, and a second portion of the air received through the fresh air inlet is drawn through the heat exchanger in the fresh air duct:

wherein the return air outlet is configured to be coupled with an HVAC system of a vehicle to provide air to the HVAC system, and wherein the fresh air outlet is configured such that in a predetermined mode of operation, air exiting from the fresh air outlet is exhausted to an exterior of the vehicle without passing through the HVAC system.

2. The ventilation module of claim 1, wherein, in the first mode of operation a second portion of the air drawn through the heat exchangers is drawn through the fresh air outlet.

3. The ventilation module of claim 1, wherein the control circuitry is electrically coupled to, and configured to control, the HVAC system.

4. The ventilation module of claim 1, wherein the control circuitry is electrically coupled to, and configured to measure, temperatures measured by an exterior temperature sensor and an interior temperature sensor.

5. The ventilation module of claim 1, wherein the control circuitry is electrically coupled to one or more sensors selected from the group consisting of: a temperature sensor, a hygrometer, a sling psychrometer, an air quality sensor, and an air speed sensor.

6. The ventilation module of claim 1, wherein the fresh air inlet is a scoop configured to receive air when the vehicle is moving forward.

7. The ventilation module of claim 1, wherein the return air outlet is fluidly and thermally coupled to the HVAC system.

8. The ventilation module of claim 1, further comprising a third door coupled to the return air inlet, the third door configured to selectively open and close in order to modulate an amount of return air being supplied to an air conditioning system.

9. The ventilation module of claim 1, further comprising a third door coupled to the return air inlet, the third door configured to selectively open and close in order to modulate an amount return air being supplied to the HVAC system, wherein in a third mode of operation, the third door is closed to restrict flow of return air into the return air duct such that substantially only fresh air received through the fresh air inlet is introduced into the return air duct.

10. The ventilation module of claim 1, wherein the control circuitry is further configured to operate the vehicle ventilation module in a third mode of operation, including having the first door and the second door closed, whereby substantially no air from the fresh air duct is introduced into the return air duct.

11. The ventilation module of claim 1, further comprising a fresh air fan coupled to the fresh air duct for drawing fresh air through the fresh air duct.

12. The ventilation module of claim 1, further comprising a flue coupled to the fresh air duct for drawing fresh air through the fresh air duct.

13. The ventilation module of claim 1, further comprising a third door coupled to the fresh air inlet, the third door configured to selectively open and close in order to modulate an amount of fresh air being supplied to the air conditioning system.

14. The ventilation module of claim 1, wherein the control circuitry is further configured to:

determine one or more of the following: (i) a temperature of air needed for the HVAC system, (ii) a humidity of the air need for the HVAC system, (iii) a percentage of fresh air need for the HVAC system, (iv) whether the return air is cooler or warmer than the fresh air, and (v) whether the return air has a lower or higher relative humidity that the fresh air, and close the first door and open the second door, if it is determined that the fresh air or air at a higher temperature is needed for the HVAC system, and that the return air is cooler or has a lower relative humidity than the fresh air, and open the first door and close the second door, if it is determined that the fresh air or air at a lower temperature or at a lower humidity is needed for the HVAC system, and that the return air is warmer or has a higher relative humidity than the fresh air.

15. The vehicle ventilation module of claim 14, further comprising a third door coupled to the return air inlet, wherein the control circuitry is further configured to open one or more of the first and second doors, and at least partially close the third door to modulate an amount of the return air introduced through the return air inlet.

* * * * *

UNITED STATES PATENT AND TRADEMARK OFFICE
CERTIFICATE OF CORRECTION

| | | |
|---|---|---|
| PATENT NO. | : 9,796,239 B2 | Page 1 of 1 |
| APPLICATION NO. | : 14/209961 | |
| DATED | : October 24, 2017 | |
| INVENTOR(S) | : Connell | |

It is certified that error appears in the above-identified patent and that said Letters Patent is hereby corrected as shown below:

In the Claims

Claim 14, Column 12, Line 24, please delete "humidity that the" and insert --humidity than the--.

Signed and Sealed this
Second Day of January, 2018

Joseph Matal
*Performing the Functions and Duties of the*
*Under Secretary of Commerce for Intellectual Property and*
*Director of the United States Patent and Trademark Office*